（12）United States Patent
Yamazaki et al.

(10) Patent No.: US 6,673,739 B2
(45) Date of Patent: Jan. 6, 2004

(54) CATALYST FOR CO SHIFT REACTION

(75) Inventors: Kiyoshi Yamazaki, Aichi (JP); Akihiko Suda, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 75 days.

(21) Appl. No.: 10/061,288

(22) Filed: Feb. 4, 2002

(65) Prior Publication Data

US 2002/0151435 A1 Oct. 17, 2002

(30) Foreign Application Priority Data

Feb. 5, 2001 (JP) .......................... 2001-028206

(51) Int. Cl.[7] .................. B01J 27/02; B01J 27/053; B01J 23/40; B01J 23/42; B01J 23/00
(52) U.S. Cl. .................. 502/216; 502/217; 502/326; 502/339; 502/350
(58) Field of Search ................ 502/216, 217, 502/326, 339, 350

(56) References Cited

U.S. PATENT DOCUMENTS

| | | | | |
|---|---|---|---|---|
| 4,483,943 A | * | 11/1984 | Windawi et al. | 502/342 |
| 4,595,703 A | * | 6/1986 | Payne et al. | 518/715 |
| 4,920,088 A | * | 4/1990 | Kolts | 502/326 |
| 4,956,330 A | * | 9/1990 | Elliott et al. | 502/326 |
| 5,066,632 A | * | 11/1991 | Baird, Jr. et al. | 502/223 |
| 5,610,117 A | * | 3/1997 | Horiuchi et al. | 502/324 |
| 2002/0107142 A1 | * | 8/2002 | Yamazaki et al. | 502/339 |

OTHER PUBLICATIONS

Wang Hongli, et al., "The SMSI and Catalytic Activity for Water Gas Shift Reaction of Pt TiO System", China–Japan–U.S. Symposium Hetero. Catal. Relat. Energy Probl. B09C, pp. 213–217 (no month avail.).

* cited by examiner

*Primary Examiner*—Mark L. Bell
*Assistant Examiner*—Patricia L. Hailey
(74) *Attorney, Agent, or Firm*—Oblon, Spivak, McClelland, Maier & Neustadt, P.C.

(57) ABSTRACT

A practical catalyst exhibiting especially high CO shift reaction activity in a low temperature region where CO is favorably converted to $H_2$ in equilibrium includes a carrier which is composed of titania as a main component, a noble metal which is supported on the carrier, and a sulfur-containing material which adheres to the carrier. The titania carrier to which the sulfur-containing material adheres exhibits high solid acid strength, and accordingly acts to absorb electrons from noble metal so that noble metal becomes partially oxidized. This results in the CO adsorbing ability decreasing to restrain poisoning of noble metal due to CO, whereby the CO shift reaction activity in a low temperature region is improved.

11 Claims, 2 Drawing Sheets

CATALYST FOR CO SHIFT REACTION

BACKGROUND OF THE INVENTION

1. Field of the Invention

The present invention relates to a catalyst for CO shift reaction by which hydrogen ($H_2$) is formed from carbon monoxide (CO) and water vapor ($H_2O$), and more particularly, to a catalyst for CO shift reaction, which exhibits high activity under the conditions where the space velocity is high and the amount of water vapor is small, and can be used for fuel cells and purifying exhaust gases from an internal combustion engines.

2. Description of Related Art

The CO shift reaction has been applied to the synthesis of ammonia, removal of CO from city gas, adjustment of $CO/H_2$ ratio in the synthesis of methanol and oxosynthesis, or the like. And recently, the CO shift reaction has been also used to remove CO in fuel reforming systems of internal reforming fuel cells. As shown in Reaction equation 1, the CO shift reaction is the reaction of forming $H_2$ from CO and $H_2O$, and is also referred to as water gas shift reaction.

Reaction equation 1

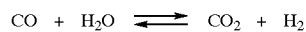

Examples of the catalyst for promoting the CO shift reaction include Cu—Zn catalysts which were reported by Girdler and Dupont Companies in the 1960s, and have been widely used in plants or the like. And in W. Hongli et al, China-Jpn.-U.S. Symp. Hetero. Catal. Relat. Energy Probl., B09C,213 (1982), there is reported that the catalyst obtained by reducing a catalyst in which Pt is supported by an anatase titania carrier at about 500° C. exhibits higher CO shift reaction activity.

In addition, it has been known that catalysts in which $\gamma$-$Al_2O_3$ supports noble metal such as Pt, Rh, Pd or the like have CO shift reaction activity. Furthermore, it has been also reported that catalysts in which $\gamma$-$Al_2O_3$ supports Cu have higher CO shift reaction activity, as compared to the catalysts in which $\gamma$-$Al_2O_3$ supports noble metal such as Pt, Rh, Pd or the like.

In fuel reforming systems of the internal reforming fuel cells for motor vehicles or other moving bodies, or exhaust gas purifying systems adapted to reform CO in exhaust gases of motor vehicles to $H_2$, and reduce $NO_x$ adsorbed on catalysts using the reformed $H_2$, the dimensions of catalytic reactors therefore are limited, and consequently, the catalysts for the CO shift reaction need to exhibit high activity even under the reaction conditions where the space velocity is high.

These conventional Cu—Zn catalysts, however, have the problem that the activity thereof is low under the reaction conditions where the space velocity is high. Accordingly, under the reaction conditions where the space velocity is high, such as those in the fuel reforming systems of the internal reforming fuel cells, or the exhaust gas purifying systems, it becomes difficult to convert CO to $H_2$ efficiently.

And the reaction expressed by the reaction equation 1 is an equilibrium reaction, and accordingly, as the reaction temperature rises, the reaction in the direction of the left-directed arrow mainly occurs to block the conversion of CO and $H_2O$ to $H_2$. Accordingly, if the reaction temperature is increased to improve the activity of the Cu—Zn catalyst under the reaction conditions where the space velocity is high, the conversion of CO and $H_2O$ to $H_2$ does not occur efficiently.

Furthermore, where the catalyst for the CO shift reaction is used in the fuel reforming systems of the internal reforming fuel cells, or the exhaust gas purifying systems of motor vehicles, the reactor may become a high temperature atmosphere temporarily due to the use conditions. In such cases, the problem also arises that the particle size of Cu as the active site of the Cu—Zn catalyst, or Cu in the catalyst in which $\gamma$-$Al_2O_3$ supports Cu, readily becomes larger, and consequently, the activity of the catalyst decreases. The efficient conversion of CO and $H_2O$ to $H_2$ becomes further difficult.

Furthermore, where the catalysts for CO shift reaction are used in the fuel reforming systems of the internal reforming fuel cells, as the concentration of $H_2O$ increases, the reaction of forming $H_2$ readily proceeds in the reaction of the reaction equation 1. Accordingly, Cu—Zn catalysts or the like have been generally used under the conditions where the $H_2O$/CO ratio is 2 or more.

However, in order to carry out this reaction in limited environments such as motor vehicles, water tanks capable of storing a large amount of water and a large-sized evaporator or the like are needed, and consequently, the device becomes undesirably huge. In addition, in order to supply water vapor, a large amount of energy is needed to evaporate water, and consequently, the energy efficiency of the overall system decreases. Accordingly, it is desired to carry out the reaction with water vapor of which the amount is as small as possible. However, when the $H_2O$/CO ratio decreases in the conventional catalyst for CO shift reaction, the activity thereof decreases, and consequently, the obtained $H_2$ is less than an equilibrium value.

Under these circumstances, it has been contemplated to use noble metals which are estimated to exhibit high activity, and to be stable in an elevated temperature atmosphere, as compared to a base metal. As described above, the activity of catalysts in which $\gamma$-$Al_2O_3$ supports noble metals such as Pt, Rh, Pd or the like is, however, lower than that of the catalysts in which $\gamma$-$Al_2O_3$ supports Cu. And it has been known that in the catalysts in which anatase titania as a carrier supports Pt, a strong metal support interaction (SMSI) occurs between Pt and anatase titania. Accordingly, where these catalysts are exposed to reaction gases in a low temperature region of 200° C. to 400° C., Pt is covered with one part of a carrier material due to the strong metal support interaction (SMSI, and consequently, active points reduce to lower the activity thereof remarkably.

SUMMARY OF THE INVENTION

It is an object of the present invention to provide practical catalysts which exhibit especially high CO shift reaction activity in a low temperature region where the reaction of CO and $H_2O$ results in a favorable conversion to $H_2$ in equilibrium.

The catalyst for CO shift reaction in accordance with the present invention is characterized in that the catalyst includes a carrier composed of titania as a main component, a noble metal supported on the carrier, and a sulfur-containing material adhering to the carrier.

It is preferable that the sulfur-containing material adheres such that the amount of pure sulfur ranges from 0.01 to 2.0 weight % of the carrier. And it is preferable that the noble metal is platinum.

Other objects, features, and characteristics of the present invention will become apparent upon consideration of the

DETAILED DESCRIPTION OF THE PRESENTLY PREFERRED EMBODIMENTS

Figure 1:
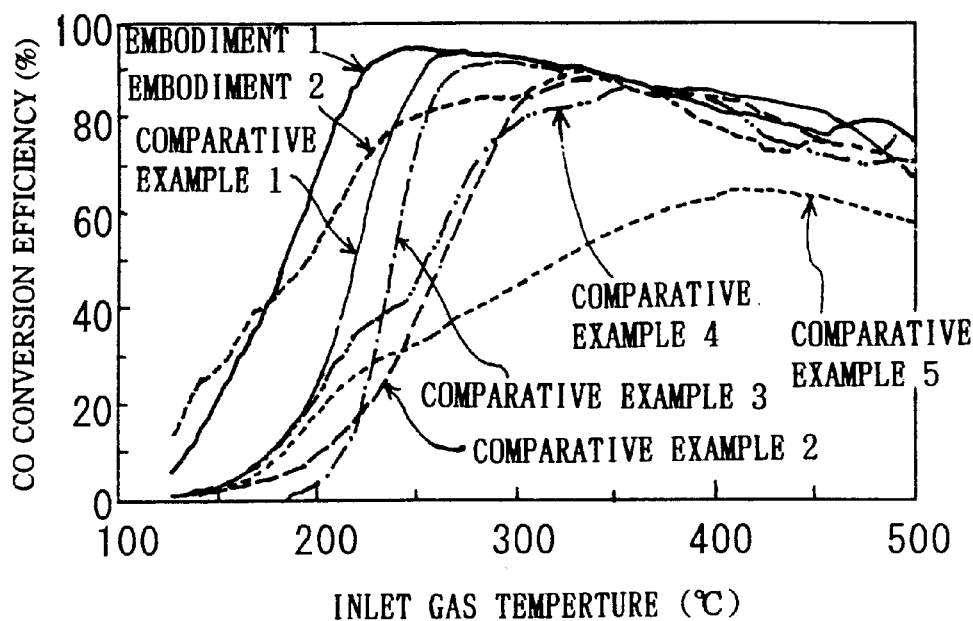
FIG. 1 is a graph showing the relation between the inlet gas temperature and the CO conversion efficiency in each of catalysts of embodiments and comparative examples.

It is considered that in the CO shift reaction, $H_2O$ and CO adsorbed on surfaces of catalysts react with each other (Langmuir-Hinshelwood mechanism). Accordingly, as the amount of $H_2O$ adsorbed on surfaces of catalysts increases, the reaction with CO is promoted. For this reason, in the catalyst for CO shift reaction in accordance with the present invention, carriers composed of titania as a main component are used. Generally, titania adsorbs a large amount of $H_2O$, and accordingly, the reaction with CO is promoted and high CO shift reaction activity is exhibited.

On the other hand, it is considered that CO is adsorbed on noble metal and becomes active to react with $H_2O$. However, in a low temperature region of 200° C. to 400° C., CO is strongly adsorbed on the noble metal, and consequently, the activity of the noble metal decreases to obstruct the reaction so that there occurs the problem that CO itself becomes a poisoning material of noble metal.

Accordingly, in accordance with the present invention, a sulfur-containing material is made to adhere to the carrier composed of titania as a main component in addition to the noble metal. With this arrangement, the CO shift reaction activity in the low temperature region is drastically improved. The reason for this improvement has not been clarified, but it is considered that when the sulfur-containing material adheres to titania, the solid acid strength is enhanced to effect the operation of absorbing electrons from noble metal so that noble metal is partially oxidized. As a result, the adsorbing force of CO becomes weak, and consequently, the poisoning of noble metal due to CO is restrained, and the CO shift reaction activity in the low temperature region is improved.

And, as described before, when the catalyst in which anatase titania supports Pt is exposed to a reaction gas in a low temperature region of 200° C. to 400° C., Pt is covered with one part of the carrier material due to (SMSI). However, in accordance with the catalyst of the present invention, such inconvenience is overcome, and the decrease in activity of Pt is prevented so that the lowering of the CO shift reaction activity is restrained. The reason for this restraint has not been clarified, but it is considered that the configurations of anatase titania crystals are prevented from varying by virtue of the sulfur-containing material adhered to the carrier.

From the above-described facts, it is considered that with the catalyst in accordance with the present invention, a large amount of $H_2O$ is adsorbed on the titania carrier, and a large amount of CO is adsorbed on the noble metal weakly, and consequently, the reaction between $H_2O$ and CO proceeds even from a low temperature region with a high efficiency to effect high CO shift reaction activity.

The carrier composed of titania as a main component may be composed of only titania, or a mixture of titania with other carrier materials such as alumina, silica, zirconia or the like. Where these other carrier materials are mixed, it is preferable that 80 weight % or more of titania is contained. When the amount of titania is less than 80 weight %, titania does not act as a main component, and consequently, the CO shift reaction activity decreases.

Titania may have the rutile structure or the anatase structure. It is especially preferable to use rutile titania. Rutile titania exhibits high hydrophilic properties, and high $H_2O$-adsorbing properties. And a large amount of CO is adsorbed on the noble metal which is supported on rutile titania. Accordingly, the CO shift reaction activity is improved by virtue of the existence of a large amount of $H_2O$ and CO which are adsorbed on surfaces of rutile titania. Furthermore, as the amount of materials on the left side of the reaction equation 1 increases, in equilibrium, the reaction in the direction of right-directed arrow in reaction equation 1 readily proceeds. The result is that the CO shift reaction activity in the low temperature region especially improves, and accordingly, in the reaction of CO and $H_2O$ CO is shifted to $H_2$ efficiently even under the reaction conditions where the space velocity is high. Accordingly, the catalytic reactors can be miniaturized so as to be used in the fuel reforming systems of internal reforming fuel cells, or in the systems of reforming CO in exhaust gases from motor vehicles to $H_2$, and reducing $NO_x$ thereby.

It has been found that when the carrier of the catalyst is composed of rutile titania and the shift reaction is conducted at about 200° C., the problem of the covering of the noble metal with the carrier does not readily occur which, in fact, occurs in with the case of the catalyst in which the carrier is composed of anatase titania. The reason for this result has not been clarified, but it is considered that the crystal structure is different between rutile titania and anatase titania, and the fact that (SMSI) occurs with difficulty in the catalyst in which rutile titania supports noble metal.

It is especially desirable to use titania of which the crystal particles have a diameter of 20 nm or less, or a specific surface area of 60 $m^2/g$ or more. In the above-described titania, there are many interfaces in which reactions occur, and the hydrophilic properties thereof is extremely high so that such titania exhibits ultra hydrophilic properties, and the adsorbing amount of $H_2O$ further increases. Therefore, the CO shift reaction activity is further improved.

Examples of the noble metal to be supported by the carrier which is composed of titania as a main component include Pt, Pd, Rh, Ir, Ru or the like. In particular, Pt capable of adsorbing a large amount of CO is desirable. Furthermore, the supporting amount of noble metal by the carrier can range from 0.1 to 20 weight % of the carrier. When the supporting amount of noble metal by the carrier is less than this range, the CO shift reaction activity is hardly obtained, and when the supporting amount of noble metal by the carrier exceeds this range, the resultant effect becomes saturated, and manufacturing costs become expensive. And noble metal is comparatively stable in high temperature atmospheres, as compared to basic metal such as Cu, and accordingly, the grain growth thereof is restrained. Therefore, the stable catalytic operation can be effected continuously for a long period of time.

The sulfur-containing material for adhering to the carrier may take the form of various sulfur compounds. However, in the case of catalysts which are used in the fuel reforming systems of internal reforming fuel cells, or in the exhaust gas purifying systems of motor vehicles, it is preferable that the sulfur-containing material may be first made to adhere to the carrier as sulfur oxides or sulfate ions which exhibit high adhering properties to the carrier for preventing the sulfur-containing material from being desorbed from the carrier in a high temperature region. Examples of the method for making the sulfur-containing material adhere to the carrier include the method of exposing the carrier to a stream containing $SO_2$, and the method of impregnating the carrier with an aqueous solution of ammonium sulfate or the like, and calcining the carrier thus impregnated.

The preferred adhering amount of sulfur-containing material ranges from 0.01 to 2.0 weight % of the carrier as pure sulfur. When the adhering amount of the sulfur-containing material is less than 0.01 weight %, the CO shift reaction activity is hardly improved, and when the adhering amount of the sulfur-containing material exceeds 2.0 weight %, the CO shift reaction activity greatly lowers. This is considered that excess sulfur-containing material poisons noble metal. The more preferred adhering amount of the sulfur-containing material ranges from 0.05 to 0.5 weight %.

In one example of the method for preparing catalysts for CO shift reaction, a titania powder, a binder and water are properly mixed to form a slurry. Then, a honeycomb substrate composed of metallic foil or ceramics are coated with the formed slurry. The obtained honeycomb substrate was dried and calcined to form a honeycomb shaped carrier. Then, the noble metal is supported thereon in a normal manner, and the sulfur-containing material is made to adhere to honeycomb shaped carrier. With this method, the catalyst for CO shift reaction in accordance with the present invention, which exhibits high CO shift reaction activity, can be obtained.

In another example of the above method, a catalyst powder is previously prepared by making a titania powder support noble metal, a binder and water are mixed with this catalyst powder properly to prepare a slurry. Then, the honeycomb substrate formed from metallic foil or ceramics is coated with the prepared slurry. The coated honeycomb substrate was dried and fired to form a honeycomb shaped catalyst. Then, the sulfur-containing material is made to adhere to the honeycomb shaped catalyst. In still another example of the method, pellets are formed from a mixture of a titania powder and a binder, and noble metal is supported on the formed pellets. Then, the sulfur-containing material is made to adhere thereto, thereby obtaining a pellets-like catalyst.

The supporting step of noble metal may be carried out before or after the adhering step of the sulfur-containing material, but it is preferable that the supporting step of noble metal is carried out before the adhering step of the sulfur-containing material, because if the supporting step is carried out after the adhering step, the adhering sulfur-containing material melts upon impregnating the carrier with the solution for supporting noble metal.

Accordingly, the catalyst for the CO shift reaction of the present invention exhibits especially high CO shift reaction activity in a low temperature region where the conversion by reaction of CO and $H_2O$ to $H_2$ is favorable under equilibrium conditions.

And the catalyst for CO shift reaction in accordance with the present invention can be used in the fuel reforming systems of internal reforming fuel cells, exhaust gas purifying systems of motor vehicles, or the like.

Hereinafter, the present invention will be explained in detail based on embodiments and comparative examples.

Embodiment 1

180 g of a titania sol containing 10 weight % of solid titania, and 140 g of an ion-exchanged water were added to 102 g of a powdered rutile titania carrier having a specific surface area of 84 $m^2/g$, and the obtained mixture was pulverized and mixed by means of a magnetic ball mill to prepare a slurry. The prepared slurry was put in a laboratory dish, and dried at 110° C. for 8 hours. Then, dried slurry was crushed and granulated to obtain pellets, each having a particle diameter of 0.5 to 1.0 mm.

The obtained pellets-like carrier was impregnated with a predetermined amount of a solution of dinitrodiammineplatinum having a predetermined concentration, and was calcined in air at 300° C. for 3 hours. Then, the pellets-like carrier was reduced in an atmosphere of $N_2$ gas which contains 10% of $H_2$ at 400° C. for 3 hours so as to support Pt. The supporting amount of Pt is 5.0 weight %.

2 g of an obtained pellets-like sample was heated at 400° C. for 30 minutes with a mixture gas shown in TABLE 1 supplied at a flowing rate of 3000 ml/minute so that the sulfur-containing material adheres to the pellets-like sample. Upon chemically analyzing, the adhering amount of the sulfur-containing material is 0.16 weight % as pure sulfur.

TABLE 1

| CO | $H_2$ | $CO_2$ | $H_2O$ | $SO_2$ | $N_2$ |
|---|---|---|---|---|---|
| 5% | 15% | 10% | 30% | 100 ppm | balance |

Embodiment 2

A pellet like sample was prepared by the method similar to that of Embodiment 1 except that rutile titania carrier was replaced with a powdered anatase titania carrier having a specific surface area of 72 $m^2/g$. The pellet like sample obtained was heated at 400° C. for 30 minutes with the mixed gas shown in TABLE 1 supplied at a flow rate of 3000 ml/minute so that the sulfur-containing material adheres to the pellet like sample. Upon chemical analysis, the adhering amount of the sulfur-containing material is 0.13 weight % as pure sulfur.

Embodiment 3

A pellets-like sample was prepared by the method similar to that of Embodiment 1. The sulfur-containing material was made to adhere thereto by impregnating 2 g of a pellets-like sample with an aqueous solution in which 0.0125 g of ammonium sulfate was dissolved, drying the impregnated sample at 110° C. for 3 hours, and firing the dried sample at 400° C. for 3 hours without using the mixture gas shown in TABLE 1. Upon chemically analyzing, the adhering amount of the sulfur-containing material is 0.13 weight % as pure sulfur.

Embodiment 4

A pellets-like sample was prepared by the method similar to that of Embodiment 1. The sulfur-containing material was made to adhere thereto by impregnating 2 g of a pellets-like sample with an aqueous solution in which 0.0005 g of ammonium sulfate was dissolved, drying the impregnated sample at 110° C. for 3 hours, and calcining the dried sample at 400° C. for 3 hours without using the mixture gas shown in TABLE. 1. Upon chemically analyzing, the adhering amount of the sulfur-containing material is 0.005 weight % as pure sulfur.

Embodiment 5

A pellets-like sample was prepared by the method similar to that of Embodiment 1. The sulfur-containing material was made to adhere thereto by impregnating 2 g of a pellets-like sample with an aqueous solution in which 0.25 g of ammonium sulfate was dissolved, drying the impregnated sample at 110° C. for 3 hours, and firing the dried sample at 400° C. for 3 hours without using the mixture gas shown in TABLE.1. Upon chemically analyzing, the adhering amount of the sulfur-containing material is 2.8 weight % as pure sulfur.

COMPARATIVE EXAMPLE 1

A pellets-like sample was prepared by the method similar to that of Embodiment 1. The sulfur-containing material was not made to adhere thereto.

COMPARATIVE EXAMPLE 2

A pellets-like sample was prepared by the method similar to that of Embodiment 1 except that the rutile titania carrier was replaced with a powdered anatase titania carrier of which the specific surface area was 72 m²/g. The sulfur-containing material was not made to adhere thereto.

COMPARATIVE EXAMPLE 3

A pellets-like sample was prepared by the method similar to that of Embodiment 1 except that the rutile titania carrier was replaced with a powdered ceria carrier of which the specific surface area was 89 m²/g. The sulfur-containing material was not made to adhere thereto.

COMPARATIVE EXAMPLE 4

2 g of the pellet-like sample of Comparative example 3 was heated at 400° C. for 30 minutes with a mixture gas shown in TABLE 1 supplied at a flowing rate of 3000 ml/minute so that the sulfur-containing material was made to adhere to the catalyst. Upon chemically analyzing, the adhering amount of the sulfur-containing material is 0.10 weight % as pure sulfur.

COMPARATIVE EXAMPLE 5

A Cu—Zn catalyst on the market (manufactured by Toyo CCI) was pulverized and granulated to obtain pellets, each having a particle diameter of 0.5 to 1.0 mm.

Test•Evaluation

The kind of the carrier and the composition of each catalyst were listed in TABLE 2.

TABLE 2

| | | Carrier | | Composition ratio against carrier (weight %) | |
|---|---|---|---|---|---|
| | | Composition and structure | Specific Surface Area (m²/g) | Supporting amount of Pt | Adhering amount of sulfur |
| Embodiment | 1 | rutile titania | 84 | | 0.16 |
| | 2 | anatase titania | 72 | | 0.13 |
| | 3 | rutile titania | 84 | | 0.13 |
| | 4 | rutile titania | 84 | | 0.005 |
| | 5 | rutile titania | 84 | | 2.8 |
| Comparative example | 1 | rutitle titania | 84 | 5.0 | — |
| | 2 | anatase titania | 72 | | — |
| | 3 | ceria | 89 | | — |

TABLE 2-continued

| | | Carrier | | Composition ratio against carrier (weight %) | |
|---|---|---|---|---|---|
| | | Composition and structure | Specific Surface Area (m²/g) | Supporting amount of Pt | Adhering amount of sulfur |
| | 4 | ceria | 89 | | 0.10 |
| | 5 | Cu—Zn | — | | — |

Experiment 1

2 g of each catalyst was weighed, and mounted on a fixed-bed flow reactor at atmospheric pressure. For pretreatment, the mounted catalyst was heated at 400° C. for 15 minutes in a model gas shown in TABLE 3. Then, the temperature was elevated from 100° C. to 500° C. at a rate of 15° C./minute with the model gas shown in TABLE 3 supplied at a flow rate of 3000 ml/minute. The space velocity is about 60,000 $h^{-1}$. The concentration of CO in the outlet gas from each catalyst was continuously measured with a nondispersive infrared CO analyzer, and the CO conversion efficiency was respectively calculated. The calculation results are shown in FIG. 1 and FIG. 2.

TABLE 3

| CO | $H_2$ | $CO_2$ | $H_2O$ | $N_2$ |
|---|---|---|---|---|
| 5% | 15% | 10% | 30% | balance |

Figure 2:
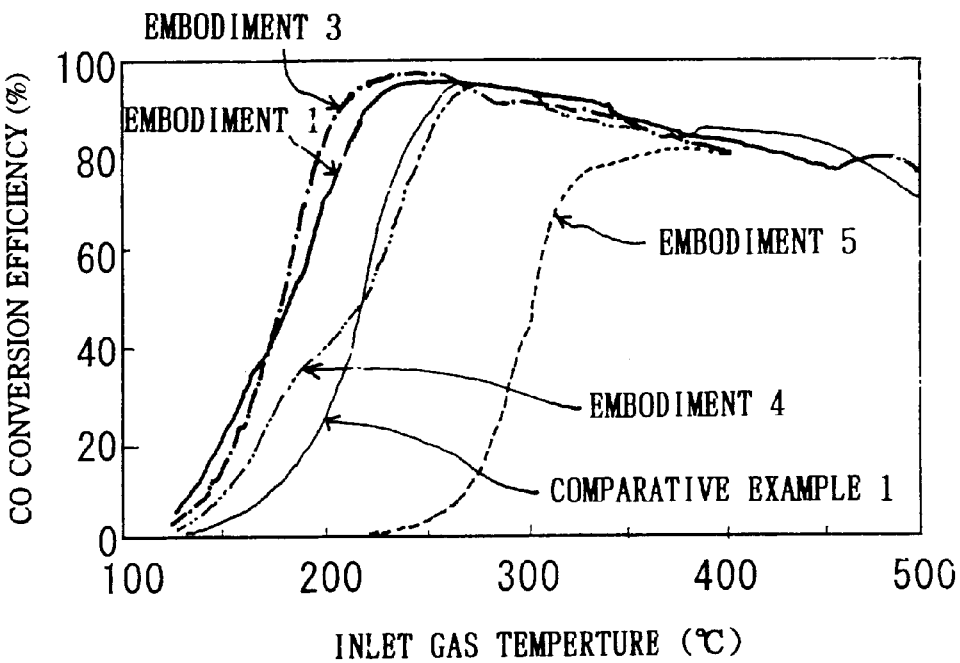
FIG. 2 is a graph showing the relation between the inlet gas temperature and the CO conversion efficiency in each of catalysts of embodiments and comparative examples.

As is apparent from FIG. 1, the catalysts of Embodiments 1 and 2 exhibit high CO conversion efficiency especially in a low temperature region, as compared to those of the catalysts of Comparative examples 1 and 2, but the CO conversion efficiency in a high temperature region scarcely differ therebetween. It is clear that these operational effects are resulted from the sulfur-containing material adhering to the catalysts. In the temperature range from 200 to 300° C., the catalyst of Embodiment 1 exhibits a higher CO conversion rate, as compared to the catalyst of Embodiment 2. This result shows that rutile titania is preferable, as compared to anatase titania.

In addition, the catalysts of Embodiments 1 and 2 exhibit high CO shift reaction activity from a low temperature region to a high temperature region, as compared to that of a conventional catalyst for CO shift reaction of Comparative example 5, which has now been widely used industrially. Namely, it is clear that when the space velocity is as high as about 60,000 $h^{-1}$, the catalysts of the present invention are greatly superior to the conventional catalyst.

On the other hand, the catalyst of Comparative example 4 exhibits slightly higher CO shift reaction activity in a low temperature region, as compared to that of the catalyst of Comparative example 3, but exhibits low CO shift reaction activity in a high temperature region. These results show that even when the sulfur-containing material adheres to the catalyst in which a ceria carrier supports Pt, the CO shift reaction activity is hardly improved.

FIG. 2 shows the relation between the adhering amount of the sulfur-containing material and the CO conversion efficiency. As is apparent from FIG. 2, the catalyst of Embodiment 4, in which the adhering amount of the sulfur-containing material is as very small as 0.005 weight %, exhibits a CO conversion efficiency approximately identical to that of the catalyst of Comparative example 1 to which no sulfur-containing material adheres, and the catalyst of Embodiment 5, in which the adhering amount of the sulfur-containing material is as high as 2.8 weight %, exhibits a greatly decreased CO conversion efficiency. These results show that there is a most suited range in the adhering amount of the sulfur-containing material, that is from 0.01 to 2.0 weight %.

There is no difference in the CO conversion efficiency between Embodiment 1 and Embodiment 3, and this result shows that there is no difference caused by the adhering method of the sulfur-containing material, and that both the method of supplying gas containing $SO_2$ and the method of impregnating with an aqueous solution of ammonium sulfate, and then calcining, are effective.

Experiment 2

Figure 3:
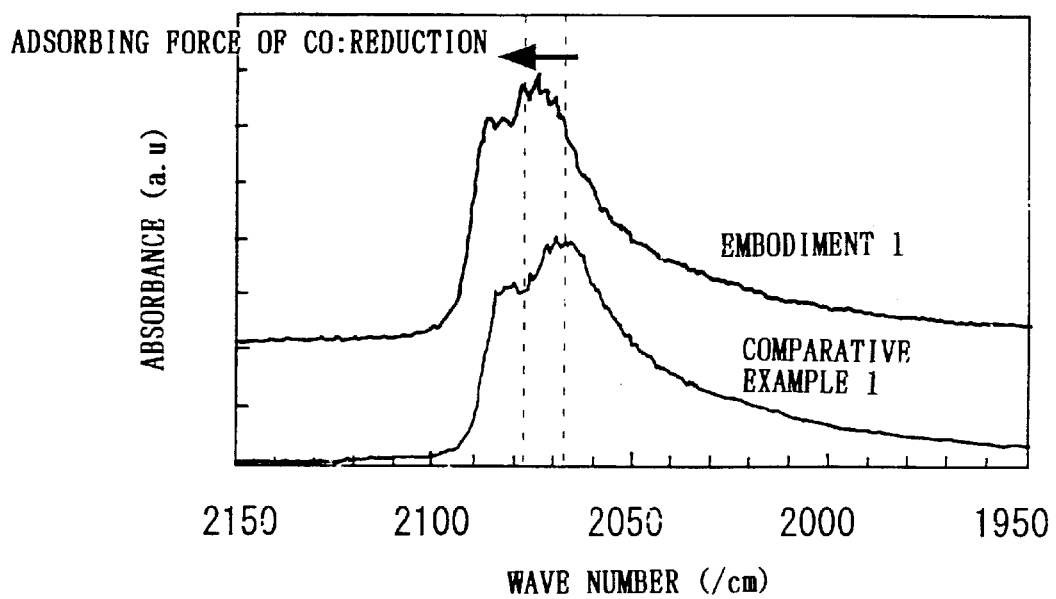
FIG. 3 is an IR spectrum of adsorbed CO in each of catalysts of Embodiment 1 and Comparative example 1.

$N_2$ gas containing 0.4% of CO was supplied to the catalysts of Embodiment 1 and Comparative example 1 so that CO is adsorbed on the catalysts. The IR spectrum of adsorbed CO is shown in FIG. 3. It is known that in the IR spectrum of adsorbed CO, as the adsorbing force of CO reduces, the absorbing peak shifts to the high wave number side.

As is apparent from FIG. 3, the strength of the spectrum of the catalyst of Embodiment 1 hardly varies, as compared to that of Comparative example 1, but the position thereof shifts to the high wave number side. Namely, in the catalyst of Embodiment 1, the adsorbing force of CO becomes weak, as compared to that of Comparative example 1, which is caused by the adhering of the sulfur-containing material.

As described above, in the catalyst of Embodiment 1, the adsorbing amount of CO is approximately equal to that of the catalyst of Comparative example 1, but the adsorbing force of CO reduces. This is considered as the reason for the improvement of the CO shift activity in a low temperature region.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for the CO shift reaction, comprising:
    a carrier composed of titania as the main component;
    a noble metal supported on said carrier; and
    a sulfur-containing material adhering to said carrier.
2. The catalyst as claimed in claim 1, wherein the amount of pure sulfur from said sulfur-containing material adhering to said carrier ranges from 0.01 to 2.0 weight % of said carrier.
3. The catalyst as claimed in claim 2, wherein the amount of pure sulfur from said sulfur-containing material adhering to said carrier ranges from 0.05 to 0.5 weight % of said carrier.
4. The catalyst as claimed in claim 1, wherein the amount of noble metal supported by said carrier ranges from 0.1 to 20 weight % of said carrier.
5. The catalyst as claimed in claim 1, wherein said carrier is comprised of 80 weight % or more of titania.
6. The catalyst as claimed in claim 1, wherein said titania is rutile titania.
7. The catalyst as claimed in claim 1, wherein said titania has a crystal particle diameter of 20 nm or less.
8. The catalyst as claimed in claim 1, wherein said titania has a specific surface area of 60 $m^2$/g or more.
9. The catalyst as claimed in claim 1, wherein said sulfur-containing material is a sulfur oxide or sulfate ions.
10. The catalyst as claimed in claim 1, wherein said noble metal is Pt, Pd, Rh, Ir or Ru.
11. The catalyst as claimed in claim 10, wherein said noble metal is platinum.

* * * * *